United States Patent [19]

Barcus

[11] Patent Number: 5,342,989
[45] Date of Patent: Aug. 30, 1994

[54] PLANAR WAVE TRANSDUCER ASSEMBLY

[75] Inventor: Lester M. Barcus, Huntington Beach, Calif.

[73] Assignee: BBE Sound, Inc., Huntington Beach, Calif.

[21] Appl. No.: 62,116

[22] Filed: May 14, 1993

[51] Int. Cl.$^5$ .......................... G01H 1/00; G01H 3/00
[52] U.S. Cl. ........................................ 84/730; 84/192; 84/723; 84/DIG. 24
[58] Field of Search ................. 84/730, 723, 743, 184, 84/192, DIG. 24

[56] References Cited

U.S. PATENT DOCUMENTS

| | | | |
|---|---|---|---|
| 4,058,045 | 11/1977 | Jennings et al. | 84/DIG. 24 |
| 4,507,805 | 2/1986 | Clevinger | 84/DIG. 24 |
| 4,785,704 | 11/1988 | Fishman | 84/DIG. 24 |
| 4,916,350 | 4/1990 | Madden et al. | 84/DIG. 24 X |
| 5,078,041 | 1/1992 | Schmued | 84/DIG. 24 |
| 5,206,449 | 4/1993 | McClish | 84/723 |
| 5,212,336 | 5/1993 | Barcus | 84/730 |
| 5,218,159 | 6/1993 | McClish | 84/731 |

Primary Examiner—William M. Shoop, Jr.
Assistant Examiner—Jeffrey W. Donels
Attorney, Agent, or Firm—Hawes & Fischer

[57] ABSTRACT

A planar wave transducer assembly comprising a rigid, unitary structure formed by a pair of foot pads attached to a planar surface, each foot pad having an upstanding leg, and a span bar extending across the tops of the legs. A piezoelectric transducer element extends between the legs of the transducer assembly in spaced, parallel alignment with the span bar to convert wave motion in the planar surface into an electrical signal. That is, the movement of one leg towards the other in response to planar wave energy causes the one leg to flex or bend so as to apply a compressive force to the piezoelectric transducer element connected between the legs. The transducer assembly herein disclosed has been found to be particularly effective as a pick up when applied to a soundboard of a musical instrument, such as a piano, and the like.

12 Claims, 3 Drawing Sheets

PLANAR WAVE TRANSDUCER ASSEMBLY

BACKGROUND OF THE INVENTION

1. Field of the Invention

This invention relates to a planar wave transducer assembly having particular application for use with a musical instrument (e.g. a piano) for converting planar waves traveling along the soundboard (but not unwanted vibrations which produce sound pressure waves in the air) into an electrical signal that is a very accurate representation of the complex tones of the instrument.

2. Background Art

In my U.S. patent application Ser. No. 07/720,406 filed Jun. 25, 1991, a highly reliable planar wave transducer assembly was disclosed including a pair of foot pads affixed to a planar surface (e.g. the soundboard of a musical instrument), an upstanding leg coextensive to each foot pad and a span bar extending between the legs above the foot pads. A piezoelectric transducer element is bonded to the span bar, and a coaxial cable is attached to the transducer element for connection to an electronic system (e.g. a preamplifier), such that a mechanical bending force applied to the span bar is converted by the transducer element into an electrical signal which is an accurate representation of the complex tones of the instrument. In particular, one of the upstanding legs of the transducer assembly moves with its respective foot pad along the soundboard (at a molecular level) relative to the other leg in response to planar wave energy generated in the soundboard. In this regard, the piezoelectric transducer element is subjected to a warping or bending in response to a corresponding bending of the span bar to which the transducer element is bonded. The ability to detect the movement of one leg relative to the other enables my earlier transducer assembly to be responsive to planar waves that propagate along the surface of the soundboard while being substantially non-responsive to undesirable vibrations that propagate at a right angle to the soundboard. By virtue of the foregoing, my earlier transducer assembly is advantageously adapted to reproduce musical sounds while avoiding the vibration and interference that are typically associated with amplification, such as by microphones, and the like.

It has now been found that the transducer assembly described above works particularly well in musical instruments having relatively thin soundboards including, but not limited to, harps and harpsichords. My new transducer assembly to be disclosed below has been found to be ideally suited for musical instruments having thicker soundboards, such as a piano. To accomplish the foregoing, and as will soon be described, the piezoelectric transducer element of my new transducer assembly is responsive to horizontal compression forces generated by the opposing legs of the assembly rather than to bending forces applied to the span bar as one leg moves relative to the other.

SUMMARY OF THE INVENTION

The planar wave transducer assembly of the present invention comprises a unitary, rigid structure including a pair of foot pads attached to the soundboard of a musical instrument (e.g. a piano), an upstanding leg coextensive to each foot pad, and a span bar attached to and extending between the tops of the legs. A piezoelectric transducer element extends between the legs in parallel alignment with the span bar so that a vertical gap is established between the transducer element and the span bar. One of the pair of foot pads is adapted to move (at a molecular level) along the soundboard towards the other foot pad in response to planar wave energy in the soundboard. Such movement of the foot pad is transferred to the respective leg to cause a corresponding flexure or bending of the leg, whereby to subject the piezoelectric transducer element extending between the legs to a compressive force. The transducer element converts the sensed mechanical compression force into an electrical signal which may be applied via a coaxial cable to an electronic system for reproduction, amplification, or the like. More particularly, the transducer assembly is responsive to the planar wave energy that propagates along the surface of the soundboard and causes one foot pad to move towards the other, but is substantially non-responsive to undesirable vibrations that are produced by the planar wave energy and propagate at right angles to the soundboard to cause the foot pads to move up and down with one another.

DETAILED DESCRIPTION

Figure 1:
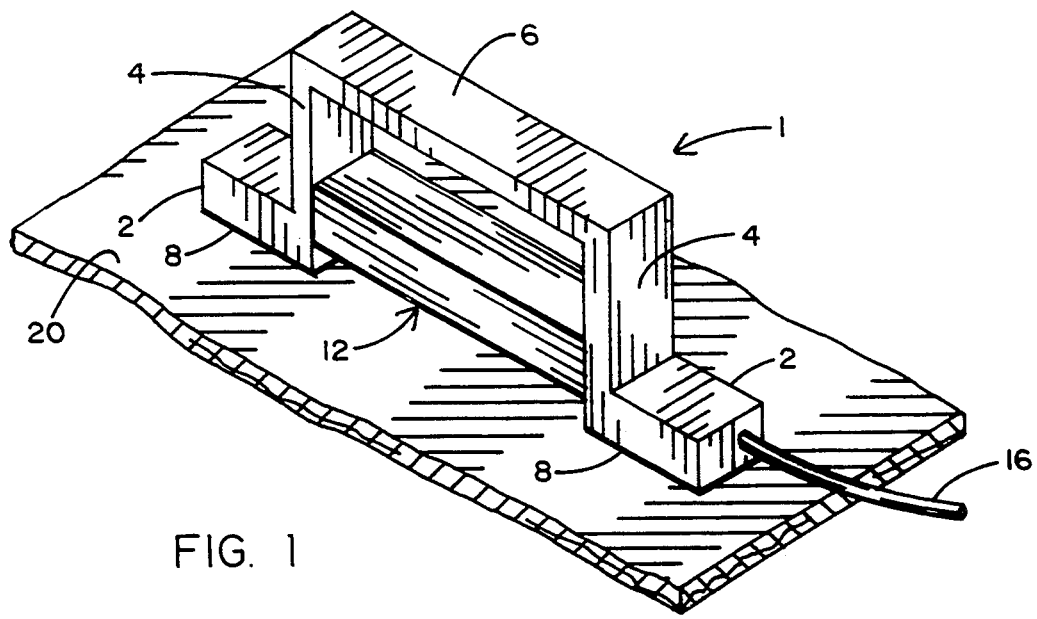
FIG. 1 is a perspective view of the planar wave transducer assembly which forms the present invention bonded to a planar surface (e.g. the soundboard of a musical instrument)
Figure 2:
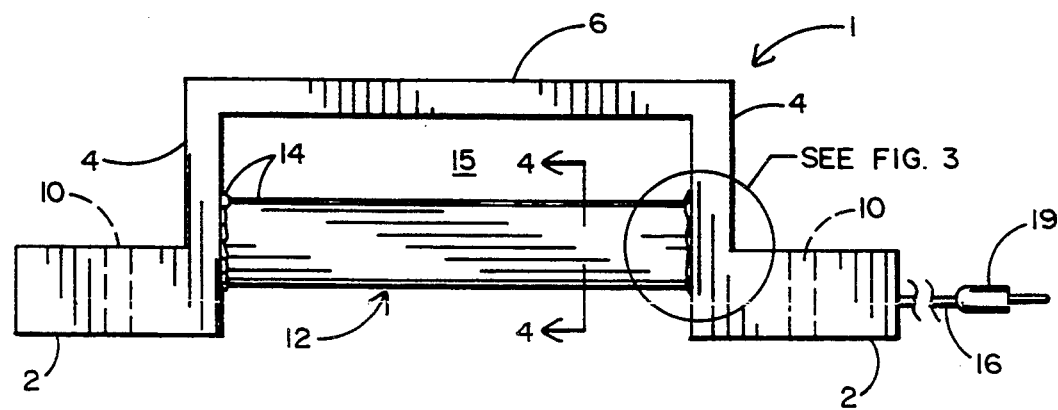
FIG. 2 is a front view of the planar wave transducer assembly of FIG. 1.
Figure 5:
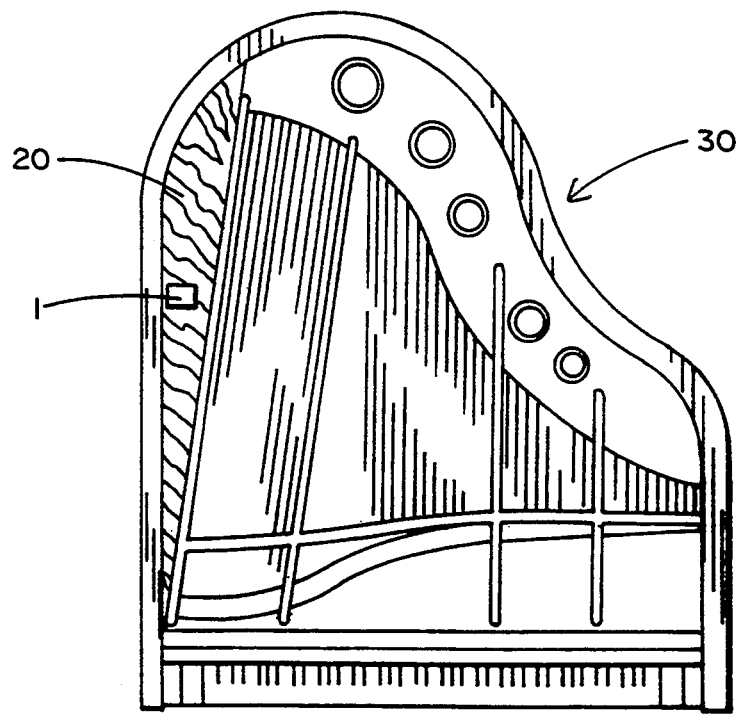
FIGS. 5 and 6 illustrate the preferred placement of the planar wave transducer assembly at the respective soundboards of different pianos.
Figure 6:
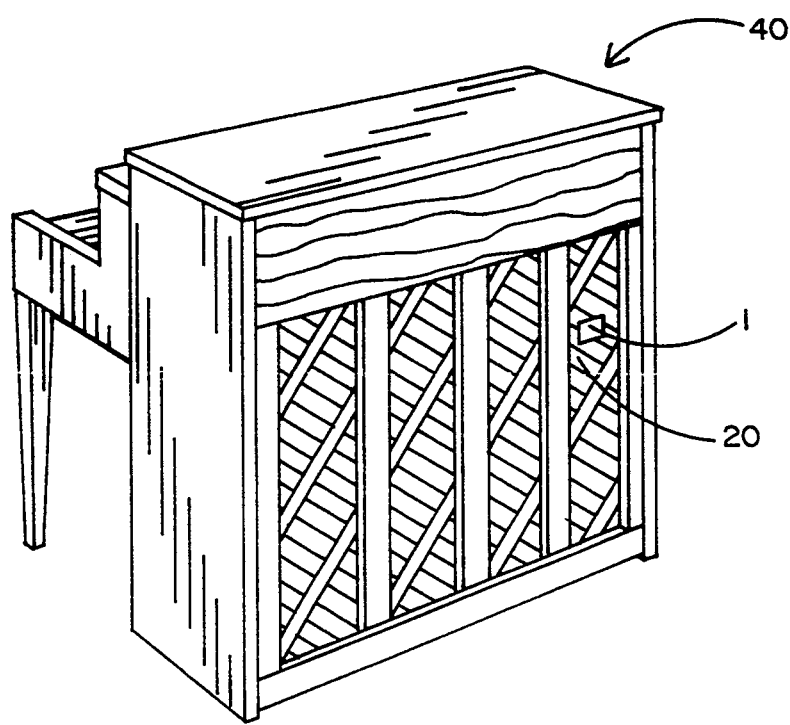

FIGS. 1 and 2 of the drawings show the planar wave transducer assembly 1 of this invention which has been found to be especially suitable for use with musical instruments having relatively thick soundboards such as, but not limited to, the pianos illustrated at FIGS. 5 and 6. The transducer assembly 1 includes a frame having two horizontally extending foot pads 2. An upstanding, vertically aligned leg 4 is coextensively connected at one end thereof to a respective foot pad 2. The opposite (i.e. top) end of each leg 4 is coextensively connected to a horizontally extending span bar 6. Thus, the frame of the transducer assembly 1 is preferably a rigid, unitary structure that is manufactured from an electrically conductive material, such as brass, or the like. That is, the foot pads 2 and span bar 6 are aligned with the legs 4 connected therebetween at substantially 90 degree angles.

Each foot pad 2 is bonded to the soundboard 20 of the musical instrument by means of a suitable pressure sensitive adhesive 8. By way of example only, the adhesive 8 may be a commercially available cyanoacrylate. To this end, holes 10 may be formed through the foot pads 4 to receive the adhesive 8 and maximize the bond between the transducer assembly 1 and the soundboard 20. Moreover, the adhesive 8 may be replaced or enhanced by inserting screws (not shown) through the holes 10 for mechanically connecting assembly 1 to soundboard 20.

Figure 3:
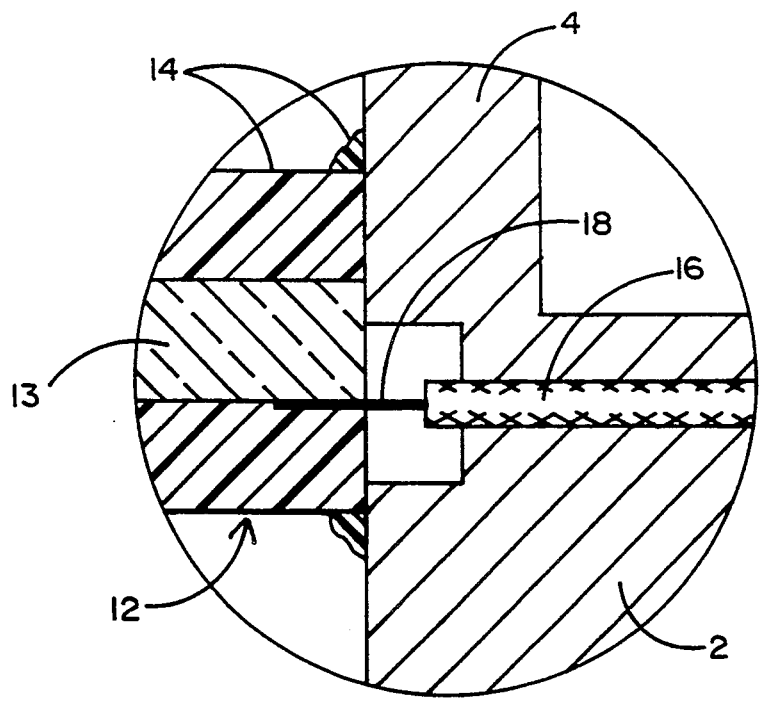
FIG. 3 is an enlargement of a detail taken from FIG. 2.
Figure 4:
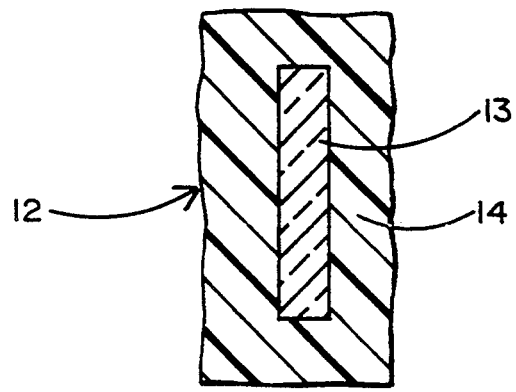
FIG. 4 is a cross-section taken along lines 4—4 of FIG. 2.

Referring now to FIGS. 3 and 4 of the drawings, a piezoelectric transducer element 12 is shown extending horizontally between the opposing legs 4 of transducer assembly 1 in spaced, parallel alignment with the span bar 6, such that a gap 15 (best shown in FIG. 2) is established between the transducer element 12 and the span bar 6. Although the vertical distance between the span bar 6 and the transducer element 12 may vary, it is desirable to locate transducer element 12 close to the foot pads 2 so as to be more responsive to molecular stresses induced in the legs 4 (as will soon be described) and aligned with an electrical cable (as will also be described). Furthermore, the ends of the transducer element 12 butt up against respective ones of the legs 4 to maximize sensitivity.

The transducer element 12 includes a piezoelectric crystal (designated 13 in FIG. 4) that is covered with and coupled to the legs 4 of assembly 1 by an insulating material 14 such as an epoxy. By way of example, the piezoelectric crystal 13 may be a lead-zirconium-titanate microcrystalline material which is a ceramic that is polarized after fabrication. In the preferred embodiment, piezoelectric crystal 13 is 1.5 inches long, 0.125 inches high and 30 mils thick. As shown in FIG. 4, the crystal 13 is turned on its edge so as to extend in a vertical plane that is perpendicularly aligned with the horizontal soundboard 20. By virtue of the foregoing, the transducer element 12 is better able to avoid vertical bounce (i.e. flexure) that might otherwise be caused on an atomic level as a consequence of key noise and similar vibrations.

Attached to the transducer element 12 is a coaxial cable 16, the center lead 18 of which is bonded directly to the piezoelectric crystal 13. The outer sheath of cable 16 runs through the adjacent foot pad 2 of transducer assembly 1 and terminates at a conventional connector 19 (best shown in FIG. 2). Connector 19 is adapted to be connected to an electronic system, such as the preamplifier described in my earlier patent application Ser. No. 07/720,406. In this regard, the teachings of application Ser. No. 07/720,406 are incorporated herein by reference. However, it is to be understood that the electronic system with which the transducer assembly 1 is associated is not to be regarded as a limitation of this invention, and transducer assembly 1 may be interconnected with other suitable systems.

In operation, any movement of the soundboard 20 of the musical instrument will cause one of the rigid legs 4 of transducer assembly 1 to flex or bend in a horizontal direction towards the opposing leg, while the rigid span bar 6 extending between the tops of the legs 4 remains stationary. More particularly, one of the foot pads 2 of transducer assembly 1 will move (on a molecular level) relative to the other in the horizontal plane of the soundboard to place assembly 1 at the legs 4 in a compression mode, as applied to a bimorph bending mode at span bar 6 as would otherwise occur in the case of the transducer assembly described in my earlier patent application Ser. No. 07/720,406. The compression force generated by the legs 4 of transducer assembly 1 is applied to the transducer element 12 located therebetween which converts the mechanical compression force to a corresponding electrical signal to be supplied from piezoelectric crystal 13 to the coaxial cable 16.

By virtue of the structure of transducer assembly 1, the piezoelectric crystal 13 will be responsive to the planar wave energy that propagates along the surface of the soundboard 20 while being substantially non-responsive to the vibrations that are produced by the planar wave energy and propagate at right angles to the soundboard 20. These vibrations are known to produce sound pressure waves that are transmitted in the air to the listener, such that eliminating the vibrations will allow the musical tones of the instrument to be more accurately discerned and reproduced. That is to say, the unwanted vibrations tend to cause the soundboard 20 to flex up and down such that the foot pads 2 of transducer assembly 1 will correspondingly move up and down with one another, whereby any force applied to the transducer element 12 as a consequence of such simultaneous up and down vertical movement will be insignificant and, therefore, go undetected.

As earlier mentioned, the transducer assembly 1 of the present invention has been found to be particularly suitable for use with musical instruments having relatively heavy soundboards, such as a piano. FIGS. 5 and 6 of the drawings show a pair of conventional pianos 30 and 40 and the preferred placement of the transducer assembly 1 on the soundboards 20 of each piano so as to be responsive to the planar wave energy that is transmitted along the respective soundboards.

By virtue of the foregoing, the planar wave transducer assembly 1 has been found to be very accurate and highly efficient (i.e. requires little energy) for reproducing the complex tones of pianos, and the like, such that the assembly will be effective even without amplification. Moreover, the output of transducer assembly 1 has been shown to have a very flat frequency response so as to eliminate the need for frequency contouring as is sometimes required in conventional sound reproducing systems. Accordingly, the transducer assembly 1 hereof may be advantageously used to convert a standard acoustic piano into a keyboard. What is more, assembly 1 may also be used as a driver for a flat aluminum plate in certain high frequency speakers.

It will be apparent that while a preferred embodiment of the invention has been shown and described, various modifications and changes may be made without departing from the true spirit and scope of the invention. For example, although the planar wave transducer assembly 1 has been described as having particular application for use on the soundboard of a musical instrument, it is to be understood that the transducer assembly 1 can also be employed in other non-musical applications, such as where the accurate measurement of physical forces in materials is required.

Having thus set forth the preferred embodiment, what is claimed is:

1. A planar wave transducer assembly to be connected to a planar surface and comprising:
   first and second legs;
   means for attaching said first and second legs to the planar surface so that said legs are spaced from one another, one of said legs moving along said planar surface relative to the other leg in response to wave motion produced in the planar surface;
   means extending between said first and second legs for sensing a compressive force applied thereto when said one leg moves towards said other leg; and
   means for converting the compressive force into an electrical signal representative of said planar wave motion.

2. The planar wave transducer assembly recited in claim 1, further comprising a span bar extending between said first and second legs to retain said first and second legs spaced from one another:

3. The planar wave transducer assembly recited in claim 2, wherein said first and second legs and said span bar form a rigid, unitary structure.

4. The planar wave transducer assembly recited in claim 2, wherein said means for sensing the compressive force and said span bar extend in spaced, parallel alignment with one another between said first and second legs.

5. The planar wave transducer assembly recited in claim 1, wherein said means for sensing said compressive force includes a piezoelectric element extending between said first and second legs.

6. The planar wave transducer assembly recited in claim 5, said piezoelectric element having a rectangular cross-section and extending edgewise and in perpendicular alignment with the planar surface between said first and second legs.

7. The planar wave transducer assembly recited in claim 5, wherein opposite ends of said piezoelectric element butt up against respective ones of said first and second legs.

8. The planar wave transducer assembly recited in claim 1, further comprising a coaxial cable, the outer sheath of said cable connected to one of said first or second legs and the center conductor of said cable connected to said means for sensing said compressive force.

9. The planar wave transducer assembly recited in claim 1, wherein said means for attaching said first and second legs to said planar surface are first and second foot pads connected respectively to said first and second legs, said foot pads affixed to said planar surface so that one of said foot pads moves along said surface relative to the other foot pad in response to said planar wave motion, the movement of said one foot pad being transferred to said respective leg to cause said leg to flex and said compressive force to be applied to said means for sensing the compressive force extending between said legs.

10. The planar wave transducer assembly recited in claim 1, wherein said planar surface is the soundboard of a musical instrument.

11. A planar wave transducer assembly to be connected to the soundboard of a musical instrument and responsive to planar waves that travel along the soundboard and substantially non-responsive to vibrations that produce sound pressure waves in the air and propagate at right angles to the soundboard, said transducer assembly comprising:

first and second legs;

means for attaching said first and second legs to said soundboard so that said legs are spaced from one another, one of said legs moving along said soundboard relative to the other leg in response to said planar waves;

a span bar extending between said first and second legs, such that said first and second legs and said span bar form a rigid structure; and transducer means extending between said first and second legs and spaced from said span bar, said transducer means sensing a compressive force applied thereto when said one leg moves towards said other leg and converting said compressive force into a signal that is representative of said planar waves.

12. The planar wave transducer assembly recited in claim 11, wherein said transducer means includes a piezoelectric element having a rectangular cross-section and extending edgewise in perpendicular alignment with the soundboard, such that first and opposite ends of said piezoelectric element engage respective ones of said first and second legs.

* * * * *